United States Patent [19]

Ehrlich et al.

[11] Patent Number: 4,686,106

[45] Date of Patent: Aug. 11, 1987

[54] PECTIN FOOD PRODUCT

[75] Inventors: Robert M. Ehrlich, North Hollywood; Raymond E. Cox, La Guna Hills, both of Calif.

[73] Assignee: General Foods Corporation, White Plains, N.Y.

[21] Appl. No.: 874,944

[22] Filed: Jun. 16, 1986

[51] Int. Cl.$^4$ .................................................. A23L 1/06
[52] U.S. Cl. ...................................... 426/577; 426/99
[58] Field of Search ................... 426/577, 99, 573, 576

[56] References Cited

U.S. PATENT DOCUMENTS

| | | | |
|---|---|---|---|
| 1,827,991 | 10/1931 | Leo | 426/99 |
| 3,140,186 | 7/1964 | Bender et al. | 426/577 |
| 3,236,657 | 2/1966 | Cox | 426/577 |
| 3,595,676 | 7/1971 | Langen et al. | 426/577 |
| 3,681,086 | 8/1972 | Cox | 426/577 |
| 3,698,917 | 10/1972 | Baum | 426/99 |

Primary Examiner—Jeanette Hunter
Attorney, Agent, or Firm—Thomas A. Marcoux; Michael J. Quillina; Daniel J. Donovan

[57] ABSTRACT

The invention relates to a dry mix comprising coarse, sanding sugar particles having an emulsifier uniformly spread across the sugar surfaces. The dry mix also contains a food acid and dry pectin ground to a particle size less than 200 mesh. The dry pectin mix is utilized to manufacture jam or jelly preparations.

7 Claims, No Drawings

PECTIN FOOD PRODUCT

TECHNICAL FIELD

This application relates to manufacturing a pectin food product and more particularly to a product in a dry-mix form for the making of jelly and jams and the jelly and jam prepared therefrom.

BACKGROUND ART

Heretofore pectin compositions have employed a variety of techniques to provide jelly or a jam preparation from a dry blend of pectin and food acid with core sugar. One of the most useful techniques used has been agglomeration. Agglomeration theoretically provides a mix which is uniform and responds accordingly to recipe directions. However, the appearance of the agglomerate is lumpy in the dried form leading the user to believe the product to be non-uniform. An approach of possible use might be to liquify the pectin and spray it onto the sugar; this is complex and costly.

In accordance with aspects of the present invention, and a primary object thereof, is to provide a dry blend of pectin and food acid base with sugar in such manner as provides a uniformly dry comestible and that reconstitutes uniformly without the presence of discrete particles in the aqueous jelly or jam.

DISCLOSURE OF THE INVENTION

In accordance with the present invention, the pectin mix comprises a coarse, sanding sugar having applied thereto an emulsifier which is blended uniformly therewith so as to uniformly spread across at least a portion of the surface of the sugar particles. The resulting sugar has the appearance of being dry. The level of emulsifier additive can vary from 0.05% to 0.15% by weight of the final mix to be hereinafter discussed. After the coated sugar is prepared, any additional sugar may be uncoated. Thereafter, discrete fine pectin of a size less than 200 mesh and a food acid of common usage such as citric, fumaric or malic acid and like acids or mixtures thereof are added to produce a sugar/acid pectin mix. The mix is adaptable to conventional storage, i.e. a package having conventional water vapor transmission properties such as a sugar bag or a box of dry pectin-sugar mixture conventional to the art and forming no part of this invention.

The dry pectin can conceivably range in methoxy content; it can be the low methoxyl type or variety, say 3% to 7% methoxyl, as well as a high methoxyl pectin with similar advantages. For purposes of this invention, the preferred uses call for pectin having a high methoxyl content in the range of 9% or higher, which corresponds to an approximate 61 D.M. and above; the most preferred pectin is one having a D.M. of 72–74, "D.M." signifying the degree of methoxylation.

The fine pectin powder in either event is essentially ground to less than 200 mesh and more preferably less than 400 mesh in particle size and is capable of discrete hydration. The pectin powder is admixed well with the pre-emulsifier coated sugar particles and in turn partially coats as it contacts same during mixing therewith. Thus, the pectin particles are ground to a degree whereof they are highly dispersable in water prior to complete solubilization of the sugar. Indeed, the fineness of the dry pectin is such that it is uniformly spread on the surface of the coarse sugar particles, thereby assuring complete dispersibility before the sugar is dissolved. In this connection, the emulsifier binds the fine pectin particles to the surfaces of the coarse sugar.

As indicated previously, the sugar is a coarse confectioners', sanding sugar, typically one having a property such as offered by one having 8% retained on a U.S. 20 mesh screen, 51.9% on a U.S. 30 mesh screen, 36.2% on a U.S. 40 mesh screen, 3.5% on a U.S. 50 mesh screen and the balance thrus.

The emulsifier of preferred use is the monoglyceride and diglyceride mixture commonly distributed under the trademark Myvacet. Although most mixtures of mono- and diglycerides will work with equal utility, the preferred form is the distilled type, typically type N-40 manufactured by Distillation Products Industries, Division of Eastman Kodak Company, Inc. A less preferred but useful form of the emulsifier is triacetin, such as may be provided by companies such as Eastman Kodak aforementioned. Also mixtures of mono and diglycerides and triacetin may be utilized.

The foregoing emulsifiers or mixtures thereof are applied at a level of about 1,000 ppm by weight of the total mix. Use of emulsifiers is important and forms a distinct feature of the invention. The emulsifier holds down dustiness of the dry product. Moreover, such emulsifiers act as anti-foaming agents in the final gel preparation which, when the product is prepared as either a jelly or a jam, will thus not have an excess of foam released or generated by addition of the various ingredients to water as heat and stirring is applied. Without addition of such emulsifiers, the product ingredients and particularly the sugar content thereof, will form lumps when added to a fruit juice or comparable liquid. In addition, the emulsifier provides an anti-foam action which takes place during cooking of the jelly or jam as well. Of significance, however, is the fact that by so combining a non-dusty sugar matrix it is possible to admix the remaining ingredients therewith, namely the discrete pectin and food acid, as well as any additional sugar without experiencing the aforestated dust and the clumping upon hydration. The typical level of emulsifier use for the dry mix of the present invention will be from 0.05% to 0.15% (d.b), a more common and preferred range being 0.07% to 0.10% by weight of the dry mix. The amount of pectin used will depend upon the quality of the pectin, that is the pectin grade, the preferred mix product being 2.0 to 2.5 grade; using the amount of pectin in the product times the pectin grade divided by the weight of the total mix.

The invention will now be described by reference to the following operative examples.

EXAMPLE 1

A 0.3% Myvacet (mono- and di-glyceride) coating was applied uniformly on 1,967.00 grams sanding sugar and dry-blended with 3,879.8 grams of uncoated sanding sugar. Separately, 81.82 grams of high D.M. pectin (73 D.M.) having a particle size less than 200 mesh were blended with 72.00 grams of powdered citric acid and thereafter fully blended with the sugars. Thus, a preferred admixing procedure is to present the emulsifier on a minor portion (about ⅓) of the sugar and then combine the balance of the sugar. Thereafter, the fine powdered pectin and citric acid can be combined with the sugar mix and blended until a uniform mix is obtained. Blend uniformity is assured by having a consistent product pH throughout. The mix thus produced contained approximately 0.1% Myvacet.

To prepare a jelly from the above preparation 2 pounds of the mix were added to 4 cups of juice, typically grape, apple or strawberry juice. These admixed ingredients in the juice were heated to a boil, boiled for an additional 2 minutes, set aside in a container and allowed to set overnight.

To prepare a jam, a like recipe preparation was followed in that 2 pounds of mix were again combined with 4 cups of crushed fruit, typically fresh strawberries or raspberries or the rehydrated pulps thereof. The mix and these fruits were then heated to a boil and the boil was continued for an added 3-4 minutes or so. The boiled preparation was thereafter poured into canning containers and allowed to set overnight.

A grape flavored jelly was evaluated; the grape product had a pH of 2.86 and a °Brix of 60.1; a like sample of apple jelly had a final pH of 2.84 and a °Brix of 58.0; a like preparation of strawberry jam had a final pH of 2.85 and a °Brix of 59.5. Like preparations of blueberry, boysenberry and peach were prepared in the form of jams. The blueberry preparation had a °Brix of 61.6 and a pH of 2.64; the boysenberry had a °Brix 59.4 and a pH of 2.77; and the peach jam had a °Brix 61.1 and a pH of 2.92.

EXAMPLE 2

A strawberry jam with pectin mix was prepared using the procedure of Example 1, replacing the citric acid with fumaric acid and altering the levels of either acid in accordance with the procedures generally set forth below, the strawberry content being in the form of pulp having 7.9 Brix.

| Jam | °Brix | pH |
| --- | --- | --- |
| 12 grams citric acid/ 1,000 grams mix | 63.6 | 2.90 |
| 7.2 grams fumaric acid/ 1,000 grams mix | 62.0 | 2.85 |
| 8.0 grams citric acid/ 1,000 grams mix | 61.7 | 2.98 |
| 4.8 grams fumaric acid/ 1,000 grams mix | 61.5 | 2.97 |

Generally as the acid level by weight of the mix is increased, the product sets quicker and firmer. The gel state was uniform and free of lumps with the exception of the strawberry pieces. All of the foregoing strawberry jam recipes set within 2-3 hours.

While the foregoing represents descriptions of the best modes for practicing the invention, other modes are well within the skill of the art.

We claim:

1. A dry mix for jelly or jam preparation comprising coarse, sanding sugar particles and 0.05 to 0.15 percentage of an emulsifier selected from the class mono- and di-glycerides and triacetin and mixtures thereof uniformly spread across at least a portion of the sugar surfaces, the remainder of the ingredients comprising a food acid and dry pectin ground to have a particle size of less than 200 mesh and uniformly distributed throughout the sugar particles.

2. A mix according to claim 1 wherein the pectin has a methoxy content of at least 9%.

3. A mix according to claim 2 wherein the emulsifier is present at a level of 0.07% to 0.10% by weight.

4. A mix according to claim 1 wherein the pectin is present at a finished product level of 2.0 to 2.5 grade.

5. A mix according to claim 2 wherein the pectin has a particle size less than 400 mesh.

6. A mix according to claim 2 wherein the pectin has a D.M. of 72 to 74.

7. A food jelly or jam prepared from the dry mix of claim 1.

* * * * *